United States Patent Office 3,332,922
Patented July 25, 1967

3,332,922
ACRYLAMIDE POLYMERS PREPARED IN THE PRESENCE OF A REDOX CATALYST SYSTEM WHEREIN A CONSTANT FREE-RADICAL CONCENTRATION IS MAINTAINED
Merwin Frederick Hoover, Pittsburgh, Pa., assignor to Calgon Corporation, Pittsburgh, Pa.
No Drawing. Filed May 13, 1963, Ser. No. 280,116
10 Claims. (Cl. 260—89.7)

This invention relates to methods of polymerizing polymerizable ethylenically unsaturated water soluble monomers such as acrylamide. Particularly, it relates to methods for achieving fully-reacted polymer products of high molecular weight and narrow molecular weight distribution, and controlling the production thereof in a reproducible manner.

It is known that the polyacrylamides, certain of their copolymers, and polyelectrolytes derived therefrom are excellent coagulants and coagulant aids. Polyacrylamides are also useful for removing silt and like deposits and accumulations in water systems. This ability of the polyacrylamides arises from the same properties which permit them to function as coagulants and coagulant aids. In the discussion which follows, the characteristics of polymeric coagulants, coagulant aids, flocculating agents, and polymeric agents for removing silt accumulations may be considered identical.

As is known, the efficiency of a given polymeric coagulant, particularly with regard to the size of the floc, rate of settling and resultant clarity of the supernatant water, generally increases with the effective length of the polymeric molecule. To achieve effective flocculation, the coagulant aid polymer macromolecules should have a molecular weight of at least one million and preferably higher. Although very high molecular weight acrylamide polymers are theoretically more efficient coagulants and coagulant aids, molecular weights of over ten million are not desirable for practical purposes because their solutions are extraordinarily viscous and vulnerable to degradation, and also because the full potential of such large molecules for attracting and absorbing suspended particulate matter is likely not to be utilized by the time they are removed in the initial floc. On the other hand, it is even less desirable to have even small amounts of coagulant aid molecules of significantly less than one million molecular weight. Such molecules are inefficient because of their relatively small inter-colloidal particle bridging capacity, and tend to act in usually undesirable manner as dispersants. Since coagulations via physical adsorption and inter-particle bridging brought about by hydrogen bonding and electro kinetic interactions is directly related to molecular weight in a given polymer species, a polymeric coagulant aid should have as high a molecular weight as possible within the limits suggested above. It is undesirable, therefore, to manufacture for use as a coagulant aid a polyacrylamide product which contains more than a trace of relatively short molecules.

Of course, the performance of a coagulant aid is not only dependent upon the inherent hydrophilic and hydrogen-bonding qualities of the basic mer units of the polymer, but also upon the functional ionogenic groups thereon and their effect on the steric configuration of the polymer in solution. The functional groups, of which carboxylic, sulfonic, sulfomethyl, and amine groups are common examples, are preferably arranged in a statistically random pattern along the backbone of the polymer chain. Copolymerization of acrylamide with monomers already containing the desired ionogenic groups has not produced the desired random configuration; moreover, it is difficult to obtain the required ultra high molecular weights in the usual copolymerization systems. Consequently, the preferred method of producing superior coagulants and coagulant aids is to first prepare the very high molecular weight base homopolymer (e.g., polyacrylamide), and subsequently alter it via hydrolysis, sulfomethylolation, Hoffman reaction, Mannich reaction, or other known technique.

The conditions of polymerization for producing coagulant aids should be such that the resulting product is practically free of crosslinked molecules. Crosslinked molecules tend to be insoluble and hence completely ineffective as coagulant aids. In addition, the conditions for polymerizing acrylamide should be such as to completely inhibit intramolecular imidization which greatly decreases solubility and coagulating ability of the product. Intermolecular imidization is even more to be avoided because the product tends to form an insoluble gel completely useless as a coagulant aid, and also has a reduced number of hydrogen-bondable amide groups. An efficient coagulant aid is free of all undesirable cyclization, crosslinkages, and grafts.

The redox catalyst system is a known device in polymerization methods. It has been used in the past where rapid polymerization rates were desired at low temperatures. See for example, Weisgerber's Canadian Patent No. 521,324. However, for the very reason that by the usual method of its application the redox system brings about a rapid polymerization, it has heretofore been undesirable for many applications, particularly for the production of superior coagulant products, because the porduct as heretofore made contains a wide distribution of molecular weights and is unreproducible from batch to batch, at least in coagulating ability. Indeed, in the usual batch polymerization of acrylic monomers it is often observed that without the addition of a high temperature polishing-catalyst, as much as one to two percent of the monomer is not polymerized at all. In the manufacture of polyacrylamides to be used as coagulants and coagulant aids, this is extremely undesirable not only from the standpoint of product efficiency, but also because the monomer is toxic and cannot be tolerated in greater than trace amounts in potable waters. Polyacrylamides, to be used as coagulant and coagulant aids, should have practically no residual monomer and a minimum of short chains below those of practical effect in flocculation (e.g., molecular weight $<10^6$).

Thus, the requirements for the manufacture of a polyacrylamide coagulant or coagulant aid base-polymer are that the porduct should have a uniformly high molecular weight or chain length, an extremely low residual monomer content, a minimum of short chains having a molecular weight less than about $10^6$, virtually no cyclization and crosslinkages, and relative ease of reproducibility and control from batch to batch. My invention provides all of the aforementioned desirable characteristics.

My invention includes the steps of preparing an aqueous solution of acrylamide monomer, the solution having a pH of about 3–9 and containing about 0.001 p.p.m. –5 p.p.m. active copper ion and virtually no dissolved oxygen, adding a small amount of an oxidizing moiety of an effective redox catalyst system (preferably about 0.025–2.5% based on the weight of the monomer) and, while maintaining the mixture in an oxygen-free environment, adding a reducing moiety of the redox catalyst system at a constant controlled rate in the range of about 0.1 p.p.m.–100 p.p.m./min., simultaneously maintaining the rate of temperature increase from a value at least equal to the system activation temperature to no higher than about 90° C. substantially constant and within the range of about 0.0° C. per minute to about 1.0° C. per minute.

The most desirable results are achieved by adding the reducing agent at a constant rate and simultaneously permitting the reaction mixture temperature to increase at a constant rate. This is most conveniently achieved in an essentially adiabatic system.

I have discovered a unique method of utilizing a redox catalyst system for polymerization of water soluble polymerizable ethylenically unsaturated monomers in which the concentration of free radicals is maintained at a very low level and essentially constant throughout. In the preferred form, a large excess of oxidizing catalyst is initially included in the monomer solution at a temperature below its thermal activation. The reducing agent is then added gradually in a controlled manner throughout the exothermic polymerization reaction and the temperature rise of the reaction mixture is controlled to a steady rate.

Maintenance of the constant rate of reducing catalyst introduction and the constant rate of temperature increase insures that the free radical concentration is substantially constant and also that the polymerization rate is substantially constant, resulting in narrow molecular weight distribution.

My invention includes, therefore, the method of controlling the molecular weight of water-soluble polymers of ethylenically unsaturated monomers comprising (a) maintaining at least a threshold amount of active promoter metal ions in the reaction system, and (b) controlling the concentration of free radicals by controlling the introduction to the system of redox reducing component throughout the polymerization reaction in the presence of a large excess of oxidizing agent.

Several variations in the above statement of the procedure may be made within the scope of my invention. For example, at least a portion of the oxidizing catalyst may be fed into the reaction vessel at some time during the course of the reaction. The procedure may be varied, for example, in concentration, pH, amount and kind of activating agent, temperature, and the like, depending on the type of compound being reacted and the characteristics of the product desired, as will be fully explained infra.

As is known in the art, the presence of oxygen dissolved in the initial monomer solution is highly undesirable because it consumes initiator free radicals and results in prolonged induction periods. Oxygen is also undesirable because it may be incorporated as weak peroxide linkages in the polymer molecule. The most convenient method of ridding the solution of oxygen is the nitrogen purge method in which $N_2$ gas is bubbled through the solution for a period of time sufficient to replace the oxygen. As is known, this is preferably done at about 0° C. Thereafter, a blanket of nitrogen is kept on the system during the polymerization reaction to prevent the further addition of oxygen from the air while the mixture is polymerized.

The redox catalyst system may include as examples of oxidizing agents one or more of the following: An alkali metal or ammonium persulfate (peroxydisulfate) of the formula $M_2S_2O_8$ where M is an alkali metal or ammonium; alkali metal peroxides; alkali metal perborates; alkali metal perphosphates, peracids, peresters, percarbonates, or any other per compound capable of dissociating into free radical species. As reducing agent, any of the following may be used, among others, sodium thiosulfate, sodium sulfite, sodium bisulfite, sodium metabisulfite, sodium hydrosulfite, hydrazine hydrate, nitrilotrispropionamide, sodium sulfoxalate formaldehyde, ascorbic acid, methylene blue, and mercaptans such as 2-mercaptoethanol, etc. Any other effective redox system may be used. For example, hydrogen peroxide may be used together with a ferrous salt such as ferrous ammonium sulfate. Other redox systems such as the chloratesulfite system and the ceric nitrate -(3-chloro-2-propanol) system are known in the art and may be used. Any catalyst system which generates free radicals and operates by the redox principle may be used in my invention. I prefer to use, when polymerizing acrylamide, the known system of ammonium persulfate as the oxidizing catalyst and sodium metabisulfite as the reducing agent. Bacon, R.G.R., Trans. Faraday Soc., vol. 42, 140–155 (1946).

Although the pH may be varied from about 3 to about 9, I have found that it is highly desirable to operate the reaction in the range of pH 5.5–8.5, preferably 7.5. The pH has a significant effect on the rate of activation of catalyst.

The presence of an excess of hydrogen ions (pH<7) in solution will retard this reaction while an excess of $OH^-$ ions (pH>7) will accelerate it. Thus, the concentration of initiator free radicals ($SO_4 \cdot ^-$) at any given time, which has a direct bearing on the determination of average chain length of the product, is dependent upon pH among other factors. To maintain a constant free radical concentration, the pH should be kept constant. Although I do not wish to be bound by any theories, it is postulated that the decomposition of the persulfate ion in the presence of the bisulfite ion is as follows:

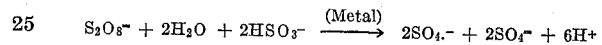

$$S_2O_8^- + 2H_2O + 2HSO_3^- \xrightarrow{\text{(Metal)}} 2SO_4 \cdot ^- + 2SO_4^- + 6H^+$$

See also the system suggested by Tsuda, J. Appl. Polymer Sci., vol. V, No. 13, pp. 104–109 (1961).

The presence of trace amounts of promoter metals, such as ferrous, cupric, cobaltic, argentic, or ceric ion, etc., is essential to the generation of free radicals in a redox system. The rate of polymerization (i.e., the number of polymer chains initiated per unit of time) at any given instant is related to the concentration of free radicals at that instant. Since the molecular weight of the polymer is inversely proportional to the free radical concentration in my system, it is necessary in order to achieve high molecular weights, to maintain an extremely low concentration of free radicals in the system. By contrast, Wooten et al. have shown (Wooten et al., J. Polymer Sci. vol. 25, 403–412 (1957), that the molecular weight of the polymer is independent of the polymerization rate in a batch system in which neither moiety of the redox system is added gradually throughout the reaction.

I have discovered that the polymerization rate may be kept as low as practicable and a superior high molecular weight product achieved by maintaining in the mixture very low concentrations of metal ion and reducing agent. A uniform, reproducible product is made by accurately controlling the introduction of reducing agent to interact with the metal ion proferably already dispersed in the system.

Since copper is the most active of the known co-catalyst metal species in the persulfate-metabisulfite system, I prefer to use it in my preferred recipe. Some metal ion is essential; in the case of copper in the persulfate-metabisulfite system, about 0.001 p.p.m. active copper ion (based on the monomer weight) is essential for the generation of free radicals ($SO_4 \cdot ^-$). I have termed this concentration of copper (0.001 p.p.m.) the "threshold concentration." Ferrous, argentic, and ceric ion threshold concentrations are slightly higher. Most commercial lots of monomer contain at least a threshold amount of promoter metal ions present as impurities. However, I prefer to control the metal ion concentration. I prefer to maintain about 0.005 to about 0.1 p.p.m. of active copper in the reaction mixture. Although I do not wish to be bound by any theories, it seems tenable that the cupric ion is reduced to cuprous ion by the bisulfite and is then oxidized back to the cupric ion in the electron-pair transfer process to the persulfate. Too high a concentration of copper (e.g. >5.0 p.p.m.) or other active metal will effect chain terminations resulting in decreased molecular weight of the polymer product. I have found that the catalytic mechanism, and hence the reaction itself, can be very sensitively and completely controlled by controlling the metal ion concentration and the reductant concentration. The polymerization rate increases with the active copper concentration within the range of 0.001 p.p.m.–0.5 p.p.m.

Active ferric iron is a chain terminating agent and is therefore highly undesirable where high molecular weights are important. Ferrous ion will serve as an effective redox initiating co-catalyst, (Rodriguez et al., J. Polymer Sci., vol. 55, 713–719 (1961)). However, the presence of ferrous ion is undesirable because in the catalysis process it becomes oxidized to the ferric state and then exercises its powerful chain-terminating abilities. Ferrous iron is thus also undesirable where high molecular weight polymers are to be produced by the redox system. Any chelating agent which will selectively complex iron in preference to copper may be used to inactivate the iron, so long as it is sufficiently soluble, does not interfere with the reaction otherwise, and is unobjectionable for the final use of the polymer. Some common chelating agents such as ethylene diamine tetraacetic acid are detrimental to the redox system and should not be used. The use of a small amount of sodium salicylate for this purpose has been found to be quite effective; however, other complexing agents known to be selectively specific for iron may also be useful. About 1–5 p.p.m. (based on the total weight of the system) of sodium salicylate is capable of effectively inactivating the active iron in a typical commercial sample of monomer.

The stirring speed and type of agitation have some effect on the molecular weight of polymer molecules produced and to some extent also influence the initiation of polymerization. Agitation or stirring should not be violent because such agitation will both retard the initiation of polymerization and reduce the molecular weight of the polymer. On the other hand, some stirring or agitation is necessary to insure proper distribution of catalyst and reducing agent, and to insure homogeneous polymer-monomer distribution. An intimate blending is desired but with a minimum of shear and turbulence.

I have found that it is of great importance for a uniform, high molecular weight product that of the free radical content of the reaction mixture be kept at a substantially constant low value throughout the polymerization. The most easily controlled method of accomplishing this is to maintain the entire amount of oxidizing component in the reaction mixture together with the suitable concentration of active metal ion, and gradually feed the reducing agent at a controlled rate throughout the polymerization reaction. Other methods, such as introducing the active metal ion at a controlled rate, or controlling the concentration of metal ion with complexing agents, or introducing the oxidizing component at a controlled rate calculated to provide a constant concentration of free radicals, or introducing both oxidizing and reducing components at rates also so calculated, may be used, but I prefer the above stated method because at present it appears to be the most easily and accurately handled. For example, within a rather wide range the concentration of free radicals is relatively independent of the concentration of oxidizing moiety of the redox system. (See Wooten et al. supra, and Rodriguez et al. supra). It is easier to control the generation of free radicals by maintaining an excess of oxidizing moiety and contacting it with the reducing moiety at a controlled rate. Beginning the reaction with the entire amount of both components of the redox system present, as is conventional in the art, is definitely not satisfactory unless some other mechansim, such as control of the active metals, is used to inhibit and regulate the generation of free radicals.

A very low concentration of free radicals (assured by a controlled low concentration of reducing agent) throughout the reaction results in a high degree of polymerization. This is partly due to the fact that the number of chain terminations due to premature coupling of two growing chains is directly related to the number of growing chains present at any instant. A constantly maintained concentration of free radicals (assured by the introduction of reducing agent at a constant rate throughout the reaction) results in a relatively narrow distribution of chain lengths with high average molecular weight. A highly uniform, completely polymerized, reproducible product is obtained by, in addition to these two free radical controls, maintaining a controlled constant (linear) temperature increase during the reaction.

Ideally, the reaction would take place under isothermal conditions. However, the viscosity of the batch increases at such a rate that heat transfer becomes, for all practical purposes, completely inhibited. If, however, the temperature is permitted to increase at a controlled, preferably constant rate, in a sutable reaction vessel to insure homogeneous agitation, batch duplication becomes quite practical. When the catalyst is activated gradually in the manner previously discussed, substantially adiabatic conditions will accomplish my purpose nicely. Heat may be introduced only to the extent necessary to replace that which may be lost through the walls of the reaction vessel. Since the polymerization rate is constant, the rate of temperature increase will be constant.

Any initiation temperature is satisfactory so long as a substantially constant rate of temperature increase throughout the reaction can be maintained. The final temperature should not, however, for the manufacture of coagulants and coagulant aids from polyacrylamide, exceed that at which imidization and degradation are likely to take place, e.g. about 90° C.

The reducing component should be introduced to the reaction mixture at a rate of about 0.1 p.p.m. per minute to about 100 p.p.m. per minute, in the presence of a large excess of oxidizing agent and trace amounts of metal promoter ions, and the temperature should increase at a constant rate between 0° C. and 1.0° C. per minute from a temperature at least equal to the activation temperature of the redox system being used.

In the preferred persulfate-metabisulfite system, I prefer to begin the reaction at about 30° C. and complete it at about 60° C. During this time reducing agent is added at a constant rate between about 0.1 p.p.m./min. and 100 p.p.m./min. preferably 0.1–10.0 p.p.m./min., and the temperature increases linearly at a rate between about 0.1° C./min. to about 0.5° C./min. Initiation temperatures between about 20° C. and about 40° are preferred. The persulfate oxidizing agent is preferably maintained in a large excess over the metabisulfite reducing agent. The overall ratio of persulfate to metabisulfite (after completion of the addition of reducing agent) should not be less than about 2 to 1 by weight.

In a slightly different statement of my preferred process, it may be said that it is a method of preparing polyacrylamide comprising: Preparing an oxygen-free, 5–15% solution of acrylamide in water at a pH of 3–9 and containing a threshold amount of active metal ion, adding to the solution about 0.025% to about 2.5% (based on the weight of the monomer) of an oxidizing component of a redox catalyst system, adjusting the temperature of the batch to about 0° C. to about 45° C., and adding a reducing component at a constant rate between about 0.1 p.p.m. per minute to about 100 p.p.m. per minute while maintaining the temperature increase constant at a rate between 0° C. and 1° C. to a point preferably no higher than about 70° C.

The following specific examples will serve to illustrate my invention:

EXAMPLE I

One hundred twenty pounds of acrylamide monomer was added to 1080 pounds of deionized water to form a 10% solution in a suitably-jacketed vessel equipped with agitator, thermometer, gas purge, and solution addition facilities. The pH was adjusted to 7.5 by the addition of a small amount of KOH. It was heated to 50° C. and nitrogen-purged for one hour, then cooled to 30° C. where 108.96 gm. of ammonium persulfate (0.2% of monomer) was blended into the solution, and 1.5 p.p.m. of sodium salicylate was added and allowed to mix for 5–30 minutes to complex active ferric iron. Then 0.01 p.p.m. cupric ion was added and the reaction was initiated by commencing to feed a 0.125 molar solution of sodium metabisulfite at a rate of 15.5 ml./min. The reducing agent was fed for a period of 105 minutes during which time the temperature increased linearly at a rate of about .3° C. per minute to 60° C., when the reducing agent pump was stopped. At this point the product was a rubbery, non-flowing, hyperviscous, solid-like plastic solution.

The polyacrylamide thus prepared was then converted into an anionic coagulant by alkaline hydrolysis of 35 mole percent of the amide groups to carboxylate groups by reaction with the stoichiometric amount of caustic at 0° C. for 3 hours. After drying, the composition proved to be an excellent coagulant aid.

EXAMPLE II

One hundred twenty pounds of commercial acrylamide monomer containing metallic impurities was added to 1080 pounds of deionized water to form a 10% solution by weight in a suitably jacketed reaction vessel equipped with agitator, thermometer, gas purge, and solution addition facilities. The pH of the solution was adjusted to 7.5 by the addition of a small amount of KOH solution and heated to 50° C. where it was nitrogen-purged for one hour prior to cooling to 30° C. Then 0.2% of the weight of the monomer (108.96 gm.) of ammonium persulfate was blended into the solution. Feeding was then commenced of a 0.125 molar solution of sodium metabisulfite at a rate of 15.5 ml./min. After a one minute induction period, the polymerization reaction was initiated, resulting in a temperature rise and a concurrent viscosity increase in the system. The reaction was maintained essentially adiabatic by maintaining thermal balance with the reactor jacket. The reducing agent was pumped into the reactor for a period of one hour during which time the temperature rose linearly at a rate of about 0.50° C. The reaction rate tapered off and levelled at about 60° C. where it was held for 45 minutes to insure completion of the reaction. The final product was a hyper-viscous solid-like solution of 10% polyacrylamide. A sample of the polymer was recovered as a dry solid powder and a 0.5% solution of the polymer in 1 N sodium nitrite had a Brookfield viscosity of 18.5 c.p.s. at 25° C. using spindle No. 1 at 60 r.p.m.

Such a product may easily be converted by known means to a polyelectrolyte. In this case the polymer was 5% sulfomethylolated by the action of formaldehyde and sodium metabisulfite, catalyzed in triethylamine at 70° C. and pH 11.5 for two hours.

The evaluation of the relative effectiveness of coagulants and coagulant aids is difficult to standardize, but an approximation can be made by visual observation. The effect on a given system sample containing suspended matter may be observed by the depth of settling after a certain time, the time required to settle to a certain depth, and an estimate of the clarity of the supernatant liquid after settling is complete, etc.

In Table I, one liter samples of a coal wash-water slurry were employed using a standard gang stirrer for jar tests. Two parts per million of the flocculants listed were added to the slurries and the indicated results were observed. Under "clarity of supernatant," 6 is equivalent to distilled water and 24 is maximum cloudiness.

TABLE I.—COAL SLURRY

| Flocculant | Depth of settling after 3 minutes, inches | Time to settle to a 2 inch bed sec. | Clarity of supernatant |
| --- | --- | --- | --- |
| Separan AP-30 | 3¼ | 80 | 23 |
| Example I | 3¾ | 21 | 12 |
| Superfloc 16 | ⅜ | +200 | 24 |
| Aerofloc 3000 | ⅜ | +200 | 24 |
| Aerofloc 3171 | ⅜ | +200 | 24 |
| Aerofloc 550 | 1¾ | +200 | 21 |

In Table II, a typical low solids river water was employed. To one liter beakers of the water was added 40 p.p.m. alum, 12 p.p.m. of lime and ⅛ p.p.m. of flocculant.

Floc size is rated on an arbitrary scale from 6 to 20 in which 6 is a very large floc and 20 extremely fine. The average floc size of about 1/16" diameter will receive a rating of 12. The arbitrary settling scale in Table II ranges from 6 to 24 and is a relative estimate of the number of "fines" in the supernatant. A rating of 6 indicates no fines in the supernatant and 24 indicates no settling.

TABLE II

| Flucculant | Size of Floc | Settling | Clarity |
| --- | --- | --- | --- |
| Separan NP-10 | 9+ | 9+ | 6 |
| Example II | 8 | 8+ | 6 |
| Superfloc 16 | 8+ | 10− | 6 |
| Aerofloc 3000 | 12 | 13 | 6 |
| Aerofloc 3171 | 8+ | 10 | 6 |

EXAMPLE III

A one liter 4-necked flask equipped with a suitable agitator, thermometer, reflux condenser, gas purge tube and solution addition facilities was charged with 450 g. deionized water, 45 g. purified acrylamide, and 5 g. dimethylaminoethylmethacrylate (purified). The solution, which had a pH of 9.0, was then $N_2$-purged for one hour at 50° C. and cooled to 30° C. After the addition of 1.5 p.p.m. sodium salicylate, 0.02 p.p.m. cupric ion and 2.2 ml. of 0.2 M ammonium persulfate solution, a 0.015 M solution of sodium metabisulfite is fed into the flask at a constant, controlled rate of 0.1 ml./min. The reaction exotherm commences in about 15 seconds and the imposition of adiabatic controls achieves a temperature rise at a constant rate of 0.6° C./minute. After 35 minutes the system has attained the temperature of 50.5° C. The polymer solution is virtually solid and extremely viscous and long, stable filaments can be drawn. The material exhibited cationic flocculant abilities.

EXAMPLE IV

A one liter flask equipped like the one in Example III was charged with 450 g. deionized water, 45 g. acrylamide (purified), and 5 g. of acrylic acid. The pH was then adjusted to 7.0 by adding 18 ml. of a 20% KOH solution. It was then $N_2$-purged for one hour at 50° C. and cooled to 30° C. After the addition of 1.5 p.p.m. sodium salicylate, 0.02 p.p.m. cupric ion, and 4.4 ml. of a 0.2 M ammonium persulfate solution, the introduction of a 0.05 M sodium metabisulfite solution was commenced at the rate of 0.1 ml./min. The reaction exotherm began in about 15 seconds and the fed rate of 0.1 ml./min. was continued while the temperature rose at the rate of 0.5° C./min. After about 35 minutes the system had attained a temperature of 48° C., forming an extremely viscous solid-like solution useful as an anionic coagulant.

EXAMPLE V

Five hundred pounds of acrylamide and 4500 pounds of softened water were charged into a suitable reactor. The reactor was jacketed to provide for adiabatic temperature control and had facilities for agitation, $N_2$-purge, and solution addition. The monomer solution was adjusted to pH 7.5 with 45% KOH solution and then heated to 50° C. where it was $N_2$-purged for one hour and then cooled to 30° C. While maintaining an oxygen-free atmosphere in the reactor 100 ml. of a 0.284 M solution of sodium salicylate (2 p.p.m.) was added to the monomer solution and, after 10–15 minutes, 454 g. of ammonium persulfate (200 p.p.m.) was added as a solution and homogeneously distributed in the reactor. Then 10 ml. of a 0.107 M copper sulfate solution was added (0.02 p.p.m. $Cu^{++}$) and when thoroughly mixed into the monomer solution a 0.125 M solution of sodium metabisulfite was commenced to be fed into the reactor at a constant controlled rate of 65 ml./min. (0.68 p.p.m./min.) A temperature rise in the monomer solution was sensed within 30–60 seconds and a linear temperature increase was maintained by means of the jacket control. The exothermic temperature increase proceeded from 30° C. to 56° C. at a rate of 0.3° C. per minute. The 65 ml./min. rate of reducing agent feed was maintained throughout the period from 30° C. to 60° C. (The mixture was heated from 56° to 60°, where it was held constant for one hour to assure completion of the reaction).

Material which is identical in molecular weight and other characteristics from batch to batch may be made by this and the other recipes in the examples.

The resulting hyperviscous, solid-like plastic polyacrylamide solution of Example V having a Bingham yield value of about 20,000 dynes/cm.², was then converted by hydrolysis with potassium hyroxide into a polyelectrolyte in the following manner. 25.5 gal. of 45% KOH liquor was pumped into the reactor containing the recently made polyacrylamide, over a 25 minute period at 60 C. resulting in a pH of about 13.8. After 3 hours at 60° C. the pH was 10.5 and the polymer was then fed to a double drum dryer where the solid polymeric coagulant was recovered from the solution. The resulting anionic flocculant exhibited excellent results which were reproducible from batch to batch.

EXAMPLE VI

One hundred twenty pounds of acrylamide monomer and 1080 pounds of softened water were charged into a suitable reactor which was jacketed and equipped with $N_2$ purge and solution addition facilities. The solution had a pH of 5.6 and was adjusted to pH 7.5 by adding 57 ml. of 45% KOH solution. The monomer solution was then heated to 50° C. and purged for one hour with 100 cu. ft. of $N_2$, and then cooled to 30° C. while maintaining an oxygen-free atmosphere with $N_2$. One hundred ml. of a 0.07 M solution of sodium salicylate (2 p.p.m.) was added and 108.96 gm. of ammonium persulfate (0.2% of monomer, by weight, or 200 p.p.m.), and after 10 minutes a 0.125 M solution of sodium metabisulfite was started into the reactor at a rate of 15.5 ml./min. No reaction occurred or will occur until a catalytic amount of copper ion is introduced. After the reducing agent had been pumped into the reactor for 5–10 minutes, the reaction was initiated when desired by adding 10 ml. of a 0.0264 M solution of copper sulfate (to provide 0.03 p.p.m. $Cu^{++}$). Within 30–60 seconds, the exothermic polymerization started and proceeded at a linear rate of 0.5° C./min. to 55° C. while maintaining adiabatic conditions with the jacket. The polymer was heated to 60° C. and held for one hour to insure completion of the reaction. The reducing agent was fed at a constant rate until 60° C. was attained and then stopped.

This base homopolyacrylamide which is a 10% plastic solution, may be altered to produce a polyelectrolyte flocculant by sulfomethylolation.

In this case a mix was prepared consisting of the following:

(1) 12,000 ml. water
(2) 2,145 ml. 37% Formalin solution
(3) 4,373 gm. sodium metabisulfite
(4) 4,350 ml. 45% KOH
(5) 20.2 ml. triethylamine The above sulfomethylolation mixture, which had a pH of 12.0 was fed into the base polymer at a rate of 744 ml./min. for 18 minutes when the polymer was at 50° C. The pH was maintained at 11.5–12 by caustic feed at a temperature of 50° C. for 2 hours. At the end of 2 hours reaction time the polymer was neutralized to pH 7.0. The product resulting therefrom exhibited excellent coagulant aid ability on low solids waters.

My invention is not limited to the above illustrations and examples. It may be otherwise embodied and practiced within the scope of the following claims:

I claim:

1. Method of polymerizing acrylamide comprising (a) preparing an oxygen-free, 5–15% aqueous solution of acrylamide having a pH of about 3 to about 9 and containing about 0.005 to about 0.1 part active cupric ion per million parts by weight of the solution, thereafter maintaining said solution in a substantially oxygen-free environment, (b) adding to said solution an effective amount of the oxidizing component of a redox catalyst, (c) maintaining a substantially constant concentration of free radicals throughout the polymerization reaction by adding an effective amount of the reducing component of said redox catalyst at a constant rate throughout the polymerization reaction, and (d) maintaining a substantially constant rate of temperature increase at a rate no greater than about 1.0° C. per minute, throughout the polymerization reaction.

2. The method of claim 1 including the step of adding a non-interfering chelating agent capable of selectively complexing iron in preference to copper in an amount sufficient to reduce the concentration of active ferric ion to a level at which chain terminations due to active ferric ion are substantially completely inhibited.

3. The method of claim 1 in which the chelating agent is sodium salicylate and in which at least about 1 part per million by weight of the total system is added.

4. The method of claim 1 in which the redox system is ammonium persulfate and sodium metabisulfite.

5. The method of claim 1 in which the substantially constant rate of temperature increase is controlled by maintaining substantially adiabatic conditions.

6. Method of claim 1 in which polymerization is initiated at a temperature of about 20° C. to about 40° C.

7. Method of polymerizing acrylamide comprising:
 (a) preparing an aqueous solution of about 5 to about 15% acrylamide having a pH between about 5.5 and 8.5 and containing about 0.005 to about 0.1 part active cupric ion per million parts by weight of the acrylamide solution;
 (b) removing the active oxygen therefrom and thereafter maintaining the reaction mixture substantially oxygen-free;
 (c) adding to the reaction mixture about 0.025% to about 2.5% (based on the weight of the monomer) of an oxidizing component of an effective redox catalyst system;
 (d) initiating the polymerization reaction at a temperature between about 20° C. and 40° C. by commencing to introduce a reducing agent of said redox system at a controlled rate between about 0.1 p.p.m./min. to about 100 p.p.m./min. and continuing the introduction thereof throughout the polymerization reaction at substantially the same rate;
 (e) maintaining substantially adiabatic conditions in said reaction, thereby maintaining a substantially linear temperature increase throughout the polymerization reaction;
  whereby a high molecular weight product is produced having a narrow molecular weight distribution.

8. Method of polymerizing acrylamide comprising:
 (a) preparing an aqueous solution of about 5 to about 15% acrylamide having a pH between about 5.5 and 8.5 and containing at least a threshold amount of active promoter metal ion;
(b) removing the active oxygen therefrom and thereafter maintaining the reaction mixture substantially oxygen-free;
(c) adding to the reaction mixture at least about 0.025%, based on the weight of the monomer, of a persulfate oxidizing moiety of a redox catalyst;
(d) adding to the reaction mixture at a substantially constant rate at least about 0.1 part per million per minute throughout the polymerization process, a metabisulfite reducing moiety of said redox catalyst, the ratio of total oxidizing agent to total reducing agent being no less than about 2 to 1, and
(e) maintaining a substantially constant rate of temperature increase throughout the polymerization reaction, said rate of temperature increase being no greater than about 1.0° C. per minute.

9. In the art of polymerizing acrylamide in a 5–15% solution thereof using a redox catalyst, the method of conrolling the molecular weight of the polyacrylamide produced comprising (a) maintaining in the solution at least a threshold amount of active promoter metal ions, (b) maintaining in the solution at least about 0.025% by weight (based on the weight of the solution) of an oxidizing moiety of a redox catalyst, and (c) controlling the concentration of free radicals in the solution by adding the reducing component of said redox catalyst at an effective, substantially constant, rate through the polymerization reaction.

10. Method of claim 9 in which the active promoter metal ions are copper ions and in which said copper ions are maintained in the solution at a concentration of about 0.001 p.p.m. to about 5.0 p.p.m. based on the weight of the solution.

References Cited
UNITED STATES PATENTS

| | | | |
|---|---|---|---|
| 2,761,834 | 9/1956 | Suen et al. | 260—29.6 |
| 2,908,668 | 10/1959 | Reynolds et al. | 260—89.7 |
| 2,983,717 | 5/1961 | Henley et al. | 260—89.7 |

OTHER REFERENCES

Bovey et al.: Emulsion Polymerization, High Polymers, vol. IX.

Interscience (1955), p. 80.

Chaberek et al.: Organic Sequestering Agents, Wiley (1959), p. 155.

JOSEPH L. SCHOFER, *Primary Examiner.*

H. I. CANTOR, H. WONG, JR., *Assistant Examiners.*